United States Patent [19]

Lusignea et al.

[11] Patent Number: 5,202,165
[45] Date of Patent: Apr. 13, 1993

[54] VESSEL CONSTRUCTION

[75] Inventors: Richard W. Lusignea, Brighton; David A. Evans, Chelmsford; Joseph W. Piche, Concord, all of Mass.

[73] Assignee: Foster-Miller, Inc., Waltham, Mass.

[21] Appl. No.: 569,148

[22] Filed: Aug. 17, 1990

Related U.S. Application Data

[63] Continuation-in-part of Ser. No. 395,548, Aug. 18, 1989, abandoned.

[51] Int. Cl.[5] ............................................. B32B 1/02
[52] U.S. Cl. ...................................... 428/1; 428/35.7; 428/910; 156/172; 156/173; 156/304.1
[58] Field of Search ............... 428/1, 35.2, 35.4, 35.7, 428/36.92, 910; 220/1 B; 244/31; 156/172, 173, 304.1

[56] References Cited

U.S. PATENT DOCUMENTS

| 4,721,637 | 1/1988 | Suzuki et al. | 428/395 |
| 4,743,481 | 5/1988 | Quinlan et al. | 428/36 |
| 4,770,931 | 9/1988 | Pollock et al. | 428/304 |
| 4,963,428 | 10/1990 | Harvey et al. | 428/220 |

Primary Examiner—Alexander S. Thomas
Attorney, Agent, or Firm—David G. Conlin; Linda M. Buckley

[57] ABSTRACT

The vessel structures disclosed herein are adapted for containing a mobile or highly permeating fluid such as helium gas or liquid hydrogen or oxygen. Escape of the fluid is inhibited by a barrier layer of an oriented lyotropic liquid crystal polymer film. Preferred polymers include polybenzazole (PBZ) polymers.

20 Claims, 7 Drawing Sheets

VESSEL CONSTRUCTION

This invention was made with government support under The National Aeronautics and Space Administration Contract No. NAS530045 and U.S. Air Force Contract No. F04611-87-C-0004. The government has certain rights in this invention.

This is a continuation-in-part of copending application(s) Ser. No. 07/395,548 filed on Aug. 18, 1989 now abandoned.

BACKGROUND OF THE INVENTION

The present invention relates to vessels for containing mobile or highly permeating fluids and more particularly to such vessels which incorporate an improved barrier film.

Heretofore, cryogenic tank structures for storing spacecraft fuels, such as liquid hydrogen and methane, have typically been either entirely metallic or have employed a metal liner with a composite overwrap. These structures have not been entirely satisfactory in that the amount of metal employed, even as a liner, contributed inordinately to the weight of the spacecraft. As is understood, a certain minimum thickness of metal is required to order to permit welding for fabrication and this thickness is substantially greater than that thickness which would be necessary merely to provide the necessary impermeability. Further, tanks constructed from metal liners with composite overwraps have exhibited a relatively short life due to the mismatch in the coefficients of thermal expansion between the metal and the composite overwrap.

While composite tanks without liners have been considered, two problems have prevented the satisfactory development of such a tank: microcracking of the matrix and the relatively high gas permeability of the matrix. Microcracking of the composite is caused by the strain between the fiber bundles and the interlaminar resin. Leakage from the tanks occurs due to the porosity which is essentially inevitable in the usual method of construction which is filament winding. The permeability of most resin and polymer materials creates a similar problem with respect to this construction of scientific research balloon, particularly those intended for very high altitudes or very long duration flights. The problem with permeability is particularly acute with so-called over-pressure balloon structures in which the pressure in the interior of the balloon is appreciably higher than that of the atmosphere in which the balloon is traveling.

The improvements which are obtained with the vessel structures of the present invention are predicated upon the unexpected discovery that certain ordered liquid crystal polymers are surprisingly impermeable. Polybenzazole (PBZ) polymers are preferred liquid crystal polymers for use in the present invention. Preferred PBZ polymers are selected from the group consisting of polybenzoxazole (PBO), polybenzothiazole (PBT or PBZT) and polybenzimidazole (PBI) polymers, and random, sequential or block copolymers thereof. Polybenzazole polymers and their synthesis are described at length in numerous references, such as Wolfe, *Liquid Crystalline Polymer Compositions, Process and Products*, U.S. Pat. No. 4,533,693 (Aug. 6, 1985) and W. W. Adams et al., *The Material Science and Engineering of Rigid-Rod Polymers* (Materials Research Society 1989), which are incorporated herein by reference.

Such polymers are also disclosed in commonly assigned, copending application U.S. Ser. Nos. 07/098,710, filed Sep. 21, 1987, now U.S. Pat. No. 4,973,442, and 07/206,137, filed Jun. 13, 1988, now U.S. Pat. No. 4,963,428, which are incorporated herein by reference.

PBZ polymers preferably contain a plurality of mer units that are AB-PBZ mer units, as represented in Formula 1(a), and/or AA/BB-PBZ mer units, as represented in Formula 1(b)

1(a) AB-PBZ

1(b) AA/BB-PBZ wherein:
  Each Ar represents an aromatic group. The aromatic group may be heterocyclic, such as a pyridinylene group, but it is preferably carbocyclic. The aromatic group may be a fused or unfused polycyclic system. The aromatic group preferably contains no more than about three six-membered rings, more preferably contains no more than about two six-membered rings and most preferably consists essentially of a single six-membered ring. Examples of suitable aromatic groups include phenylene moieties, biphenylene moieties and bisphenylene ether moieties. Each Ar is most preferably a 1,2,4,5-phenylene moiety.
  Each Z is independently an oxygen atom, a sulfur atom or a nitrogen atom bonded to an alkyl group or a hydrogen atom. Each Z is preferably oxygen or sulfur (the polymer is preferably PBO, PBZT or a copolymer thereof);
  Each DM is independently a bond or a divalent organic moiety that does not interfere with the synthesis, fabrication or use of the polymer. The divalent organic moiety may contain an aliphatic group (preferably $C_1$ to $C_{12}$), but the divalent organic moiety is preferably an aromatic group (Ar) as previously described. Each DM is preferably a 1,4-phenylene moiety or a 4,4'-biphenylene moiety, and is most preferably a 1,4-phenylene moiety.
  The nitrogen atom and the Z moiety in each azole ring are bonded to adjacent carbon atoms in the aromatic group, such that a five-membered azole ring fused with the aromatic group is formed.

The azole rings in AA/BB-PBZ mer units may be in cis- or trans-position with respect to each other, as illustrated in 11 *Ency. Poly. Sci. & Eng.*, 601, at 602, (J. Wiley & Sons 1988) which is incorporated herein by reference.

The PBZ polymer may be rigid rod, semirigid rod or flexible coil. It is preferably rigid rod in the case of an AA/BB-PBZ polymer or semirigid in the case of an AB-PBZ polymer. It more preferably consists essentially of AA/BB-PBZ mer units. Exemplary highly preferred mer units are illustrated in Formulas 2 (a)–(e).

The polybenzazole polymer most preferably consists essentialy either of the mer units illustrated Formula 2(a) (cis-PBO) or of the mer units illustrated in Formula 2(c) (trans-PBZT).

Each polymer preferably contains on average at least about 25 mer units, more preferably at least about 50 mer units and most preferably at least about 100 mer units. The intrinsic viscosity of cis-PBO or trans-PBZT in methanesulfonic acid at 25° C. is preferably at least about 10 dL/g, more preferably at least about 20 dL/g and most preferably at least about 30 dL/g.

Unlike ordinary polymer molecules which are twisted and coiled, liquid crystal polymer molecules are rigid and rod-like. The micro structure consists of densely packed fibrous polymer chains or microfibrils. The microfibrils can be oriented through processing, e.g. by extruding the polymer through counter-rotating cylindrical dies followed by blowing and drawing, so as to yield a biaxial orientation. For example, PBZT resin is a lyotropic liquid crystal polymer and the extrusion is typically performed into a bath of polyphosphoric acid or similar solvent so that the extrusion results in a water-swollen oriented film. After the forming steps, the film is typically washed, dried and rolled under controlled pressure to remove the solvent and densify the sheet. Given the microfibrillar nature of the film microstructure, it was expected in accordance with conventional wisdom that these films would be highly permeable and would be suitable for use as microfiltration membranes. The vessel structures of the present invention are based in substantial part on the unexpected discovery that films comprising lyotropic liquid crystal polymers, such as PBZ polymers, are highly impermeable. Further, such films exhibit very high strength and toughness and these characteristics can be utilized to augment the structural properties of a composite structure while at the same time providing the barrier characteristics which are necessary in certain vessel applications.

Among the several objects of the present invention may be noted the provision of a vessel which is effective for containing a mobile or highly permeating fluid; the provision of such a vessel which provides very low leakage rates; the provision of such a vessel which is lightweight and strong; the provision of such a vessel which can withstand repeated and extreme variations in temperature; the provision of such a vessel which is highly reliable and which is of relatively simple and inexpensive construction. Other objects and features will be in part apparent and in part pointed out hereinafter.

SUMMARY OF THE INVENTION

Briefly, a vessel constructed in accordance with the present invention is adapted for containing a mobile or highly permeating fluid and escape of the fluid is inhibited by a barrier layer comprising an oriented liquid crystal polymer film. Preferably, the liquid crystal polymer is a PBZ polymer. Preferred PBZ polymers are selected from the group consisting of PBO, PBT, and PBI polymers, and random, sequential or block copolymers thereof.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1A:
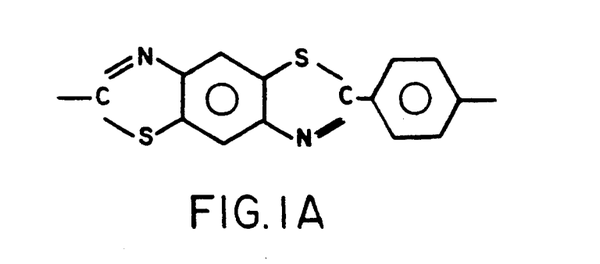
FIG. 1A is a diagram of the chemical structure of poly p-phenylene benzobisthiazole (PBZT)
Figure 1B:
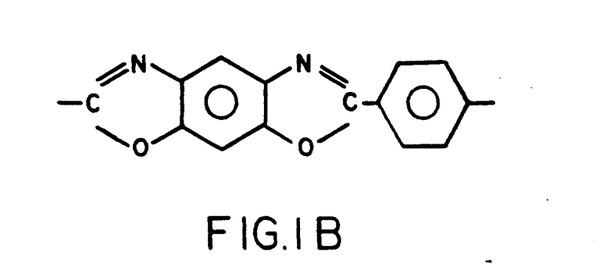
FIG. 1B is a diagram of the chemical structure of polybenzobisoxazole (PBO)

As indicated previously, one of the presently preferred lyotropic liquid crystal polymers for use in constructing barrier films and vessels in accordance with the present invention is poly p-phenylene benzobisthiazole. For the purpose of description only, the present invention will be illustrated by use of poly p-phenylene benzobisthizole, but it will be appreciated that other lyotropic liquid crystalline polymers, including other PBZ polymers, may be employed in the practice of the present invention. The chemical structure of this polymer is shown in FIG. 1. For a short description as used herein, this polymer is conveniently referred to as PBZT. Previously, this polymer was often referred to as PBT and this designation also appears herein.

Figure 2:
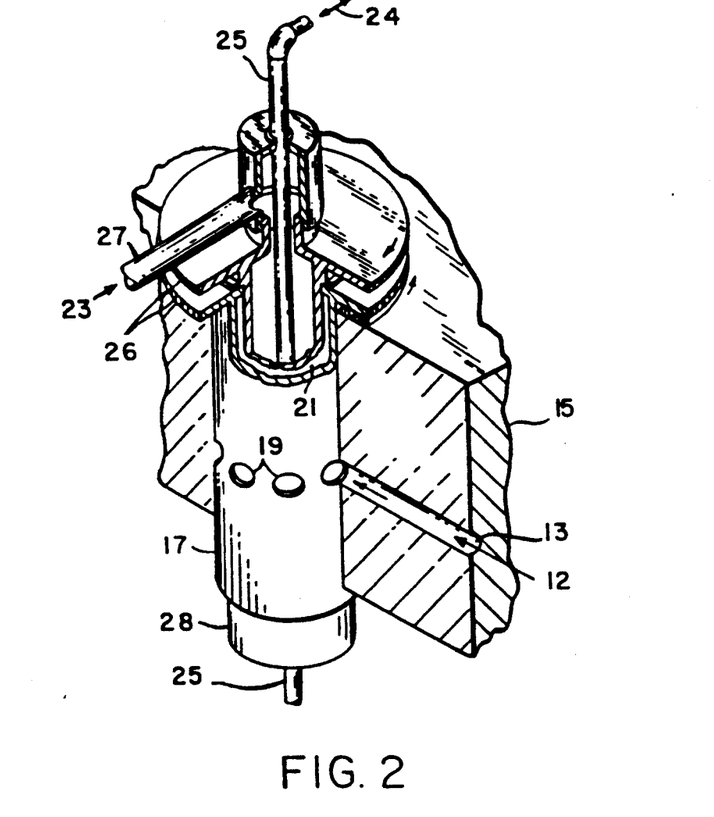
FIG. 2 is a diagram of an extruder employing counter-rotating cylindrical dies for generating an oriented film of a liquid crystal polymer.

Preferably also, the PBZT film is biaxially oriented by stressing the film as it is being formed. FIG. 2 illustrates a system of counter-rotating cylindrical die elements for introducing such stressing. Referring now to FIG. 2, a mixture of the polymer and polyphosphoric acid 12 is introduced, through a port 13 in a housing 15, to the outer surface of a counterclockwise rotating cylindrical die 17. Drive gears 26 are shown. The die 17 includes a plurality of ports 19 through which the mixture can flow to a space between the die 17 and a clockwise rotating cylindrical die 21. A siphon tube 25 is provided for equalizing water 24 pressure within the tube of polymer being extruded 28 and a neutral atmosphere of nitrogen 23 is maintained by means of a gas port 27.

Figure 3:
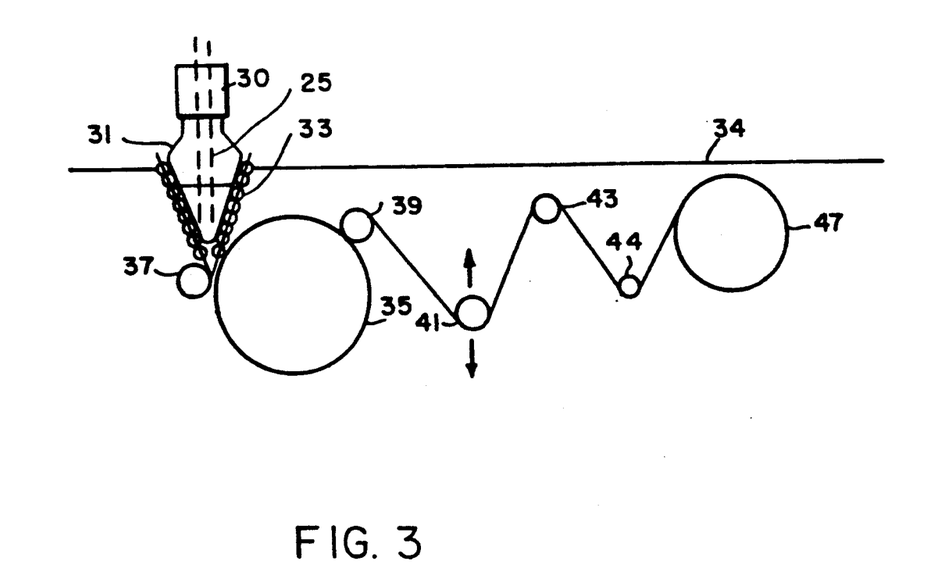
FIG. 3 is a diagram of apparatus including the extruder of FIG. 1 providing for further treatment of the film.

With reference to FIG. 3, the hollow tube of polymer being extruded from the die 30 is blown by gas pressure and allowed to balloon as indicated by reference character 31, and is then drawn down through a converging bank of rolls 33 through water 34 by a neoprene foam-wrapped drive roll 35. The film is maintained in contact with the drive roll 35 by spring-loaded, rubber-covered pinch rolls 37 and 39. After passing past a dancer roll 41, an idler roll 43 and a spreader roll 45, the collapsed film is wound up on a reel 47. To form strips, the tube is subsequently slit and, if no interpenetrating resin is to be added, the strip is dried and rolled under appropriate temperature and pressure conditions to remove the water which swells the original extrudate and to densify the film.

Figure 4:
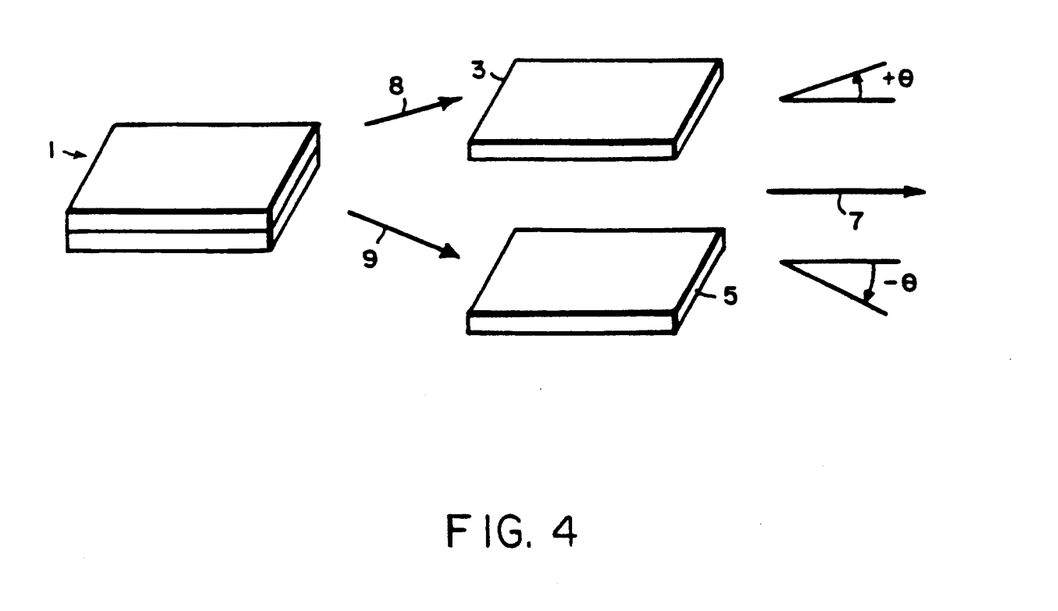
FIG. 4 is a diagram illustrating the internal orientation of the microfibrillar structure of a film constructed of PBZT utilizing the apparatus of FIGS. 2 and 3.

By virtue of the stresses introduced by the counter-rotating cylindrical dies, the composite extruded film strip 1 which results from this process is biaxially oriented. This biaxial orientation is illustrated in FIG. 4. With reference to the machine direction 7, i.e. the direction of the axis of the counter-rotating dies, the microfibrillar structure on the top portion of the film 3 is aligned at an angle 8 to one side of the machine direction while the microfibrillar structure of the bottom half of the film 5 is oriented to the opposite side 9. Preferably, the angles of the two orientations are substantially equal. By selection of the speed of the rotation of the dies in relation to the speed at which the tube is extruded and then subsequently drawn, the actual angle of the orientation can be selected from a quite broad range of angles. As will be understood, not all of the material of the film will be oriented perfectly in one direction or the other and there will, in fact, be a small area or region in the middle which has some random orientation or is oriented in the machine direction by the blowing and drawing which occurs after the extrusion.

Figure 5A:
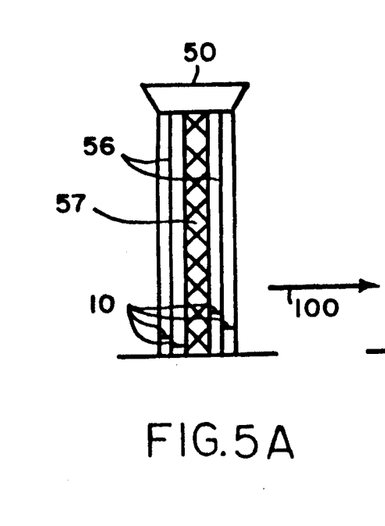
FIGS. 5A–5E illustrate process steps for introducing an interpenetrating resin into the structure of a biaxially oriented PBZT film.
Figure 5B:
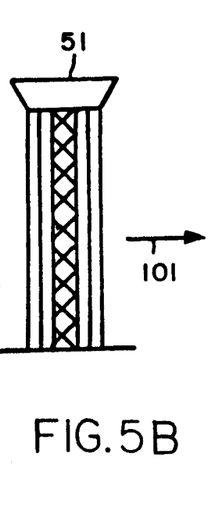
Figure 5C:
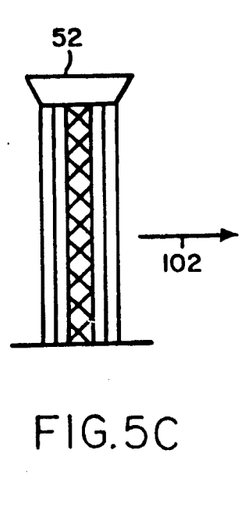
Figure 5D:
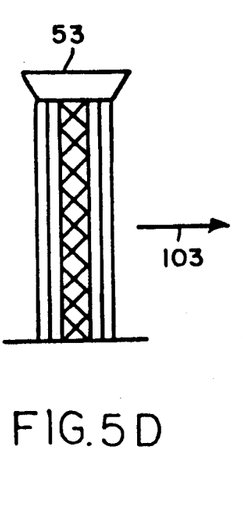
Figure 5E:
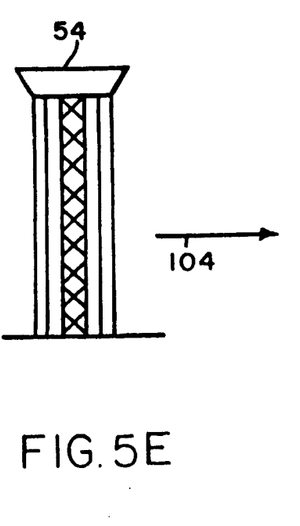
Figure 5F:
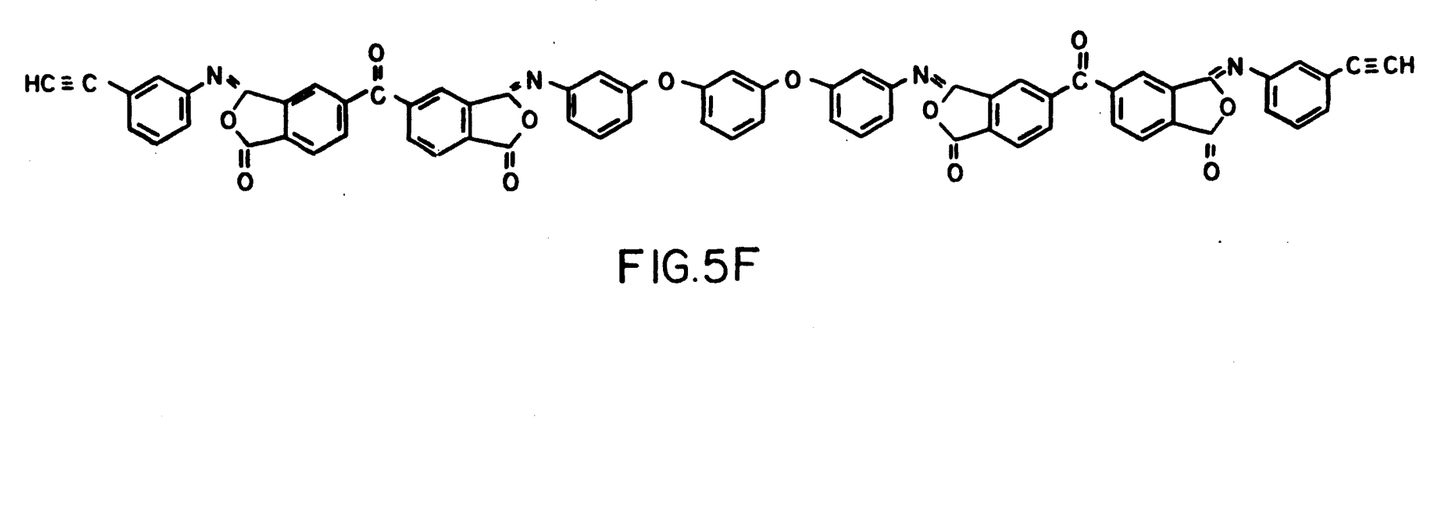
FIG. 5F is a diagram of the chemical structure of a polyimide precursor employed in the interpenetration process of FIGS. 5A–5D.

As indicated previously, the vessel structures of the present invention are to a large extent predicated upon the unexpected discovery that lyotropic liquid crystal polymer films are highly impermeable to mobile fluids. It has further been found that the permeability of such films can be further reduced by the inclusion of an interpenetrating resin. A process for introducing an interpenetrating resin into a lyotropic liquid crystal polymer film was initially explored as a procedure for improving the strength and bondability of the films and is the subject of U.S. Pat. No. 4,845,150, the disclosure of which is incorporated herein by reference. However, to facilitate an understanding of the present invention, it is appropriate to incorporate herein a general discussion of the interpenetrating process. In this process, the aqueous coagulant is replaced initially with a solvent and then with a mixture of the solvent and a resin precursor. One method of forming this substitution is to immerse the swollen film 56 on solid teflon rod 57 in a succession of containers 50 to 53, each container containing exchange solution 10 having an increased proportion of the solvent in relation to the water. In container 50 exchange solution 1 is a mixture of 25% THF and 75% water. In container 51 exchange solution 2 is a mixture of 50% THF and 50% water. In container 52, exchange solution 3 is a mixture of 75% THF and 25% water. In container 53, exchange solution 4 is 100% THF. As a last stage, in container 54 a mixture of the resin precursor in the solvent (resin infiltration solution, 25% resin in THF), is utilized so that a suitable proportion of resin precursor infiltrates the microfibrillar structure. After 8 hours in container 50, the PBT tube is transferred 100 to container 51. After 8 hours imbibition time in container 51, the tube is transferred to container 52. After 8 hours imbibition time 102 in container 52, the tube is transferred 102 to container 53. After 8 hours imbibition time in container 53, the tube is transferred 103 to container 54. After 8 hours imbibition time in container 54, the tube is transferred 104 to a drying stage 104. In the particular interpenetrating process illustrated in FIGS. 5A–5D, the water is gradually replaced with tetrahydrofuran (THF). Methanol or another water miscible solvent might also be used. In the last step, the film is immersed in container 54 in a mixture of 75 percent THF and 25 percent resin precursor. A preferred polyimide precursor is a thermosetting acetylene-terminated polyisoimide available, for example, under the trade name Thermid IP-600. This is a compound of formula as represented in FIG. 5F. Other resin systems can also be used; amongst thermosetting resins should be considered epoxides, polyurethanes, polyesters and polyimides. Any soluble polymer could be used, as is obvious to those skilled in the art. The concentration of the impregnant in the liquid crystal polymer can be varied as desired. For example, it can range from about 1 to 25% by volume but is often preferably 1 to 10% by volume. The time, temperature and pressure used during the impregnation step can be varied as desired.

Figure 6:
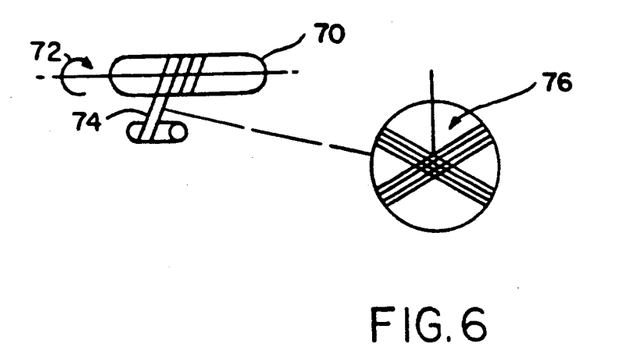
FIGS. 6 and 7 illustrate steps in winding a cryogenic tank of the present invention utilizing two differently biaxially oriented film strips of PBZT.
Figure 7:
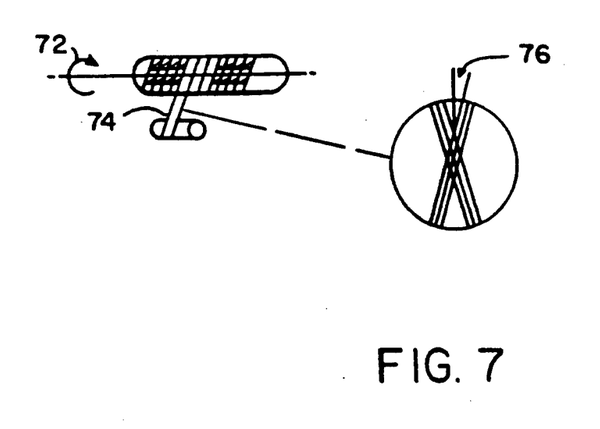

After the precursor has diffused into the washed but still swollen PBT film, e.g. via various sequential solvent exchanges, the film is dried and heat treated, causing a transformation of the added material to its final form as a strong trans-laminar binder material. By virtue of the microfibrillar structure of the PBZT material, the films of the present invention are essentially self-reinforcing in one sense. Further, the orientation of the microfibrils substantially increases the strength of the film in the direction of orientation, effecting a biaxial orientation, high strength over a substantial range of angles in the plane of the film is obtained. Further, by laminating strips of PBZT films having different angles of orientation, a desirable combination of properties can be obtained without resorting to unorthodox winding techniques. For example, a conventionally configured cylindrical tank can be constructed as illustrated in FIGS. 6 and 7. In the steps of both FIGS. 6 and 7, a mandrel 70 is rotated 72 and wound with a PBZ tape 74, the winding taking place at a conventional shallow angle. In the first step (FIG. 6), a tape 74 is applied in which the biaxial orientation is greater than 45 degrees to the axis of the tape. This winding gives axial strength and stiffness. Over this first winding is placed a second winding as illustrated in FIG. 7. This winding is performed utilizing a tape having a biaxial orientation in which the orientation is only at about three degrees to the tape axis, i.e., $\theta$ 76 is about 2°–320. This secondary winding gives substantial hoop strength and stiffness to the overall structure. During each winding step, a layer of resin is applied to bond the film layers into an integral structure, just as fiber winding is normally bonded. A presently preferred resin is Tactix 695 manufactured by Dow Chemical Co.

Figure 8A:
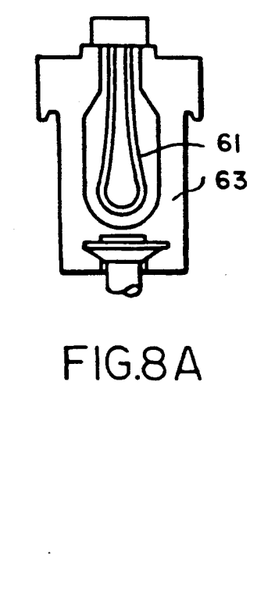
FIGS. 8A–8C illustrates a method of blow molding a cryogenic tank liner from PBZT film.
Figure 8B:
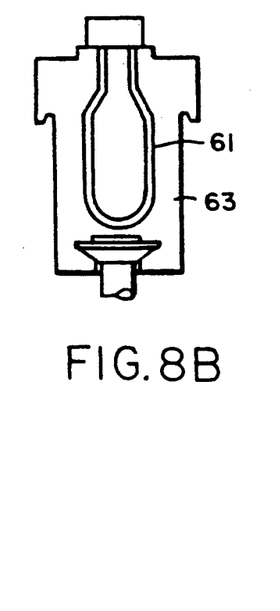
Figure 8C:
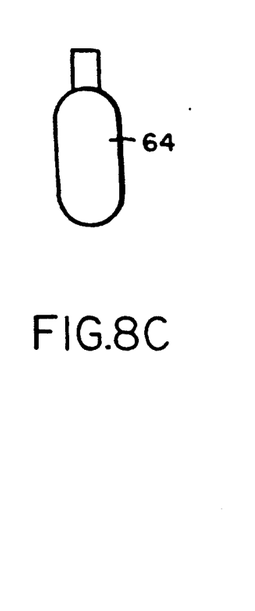

An alternative method of making a cryogenic tank is illustrated in FIGS. 8A–8C. In this alternative method, a parison 61 of PBZT is extruded into a mold 63 and then is expanded by gas pressure as illustrated in FIG. 8B to fill the mold. While in the mold 63, the polymer is coagulated and interpenetrated with resin in a manner similar to forming the film strips as described earlier so as to result in a bottle-like liner 64 as illustrated in FIG. 8C.

Figure 9:
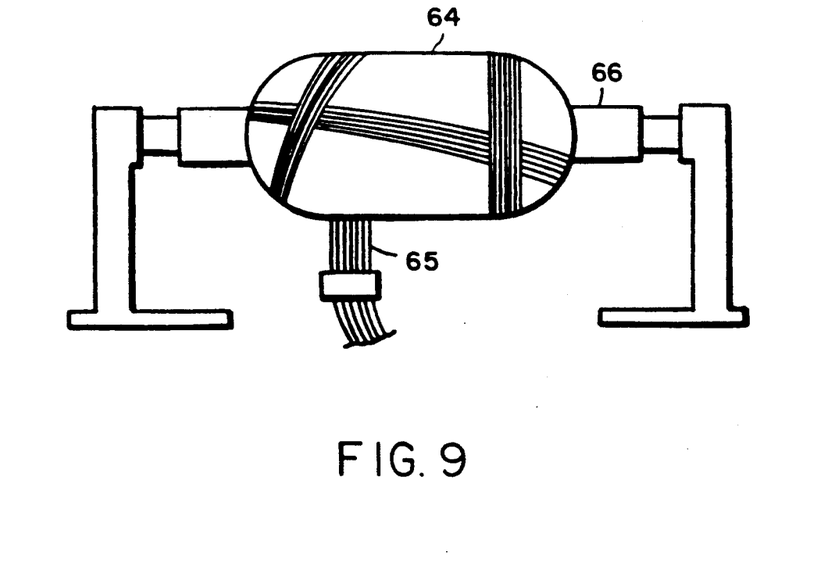
FIG. 9 illustrates the winding of the liner of FIG. 8 with filaments to form a composite supporting structure for the liner.

The liner 64 is then supported on a rotating mandrel 66 as illustrated in FIG. 9, pressurized and wrapped with carbon filament tape pre-impregnated with a suitable bonding resin, e.g., graphite 65 so as to form a composite structure in which the PBZT liner provides high permeability and the graphite composite overwrap provides physical strength. Since the PBZT has a coefficient of thermal expansion which provides a close match with that of graphite composites, microcracking of the type which occurs with metal liners is not expected to occur with the construction illustrated.

Figure 10A:
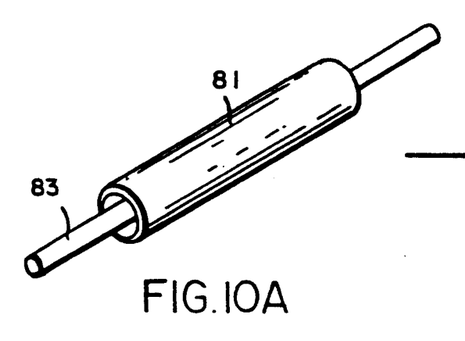
FIGS. 10A–10E illustrate an alternate method of forming a cryogenic tank in accordance with the present invention.
Figure 10B:
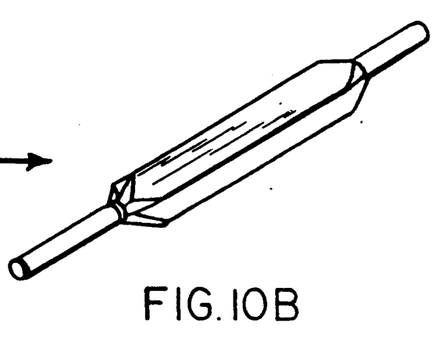
Figure 10C:
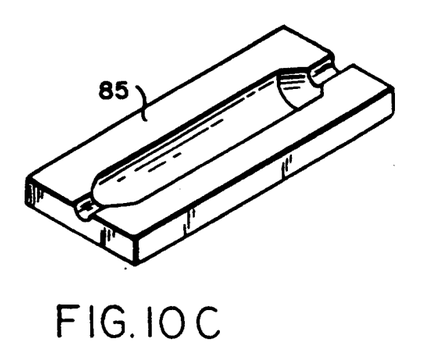
Figure 10D:
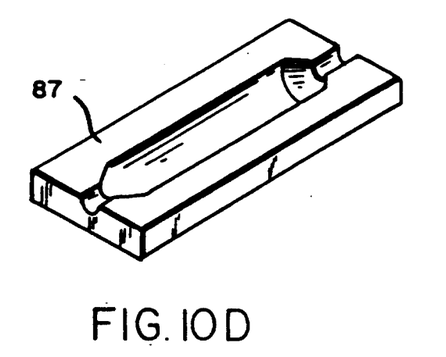
Figure 10E:
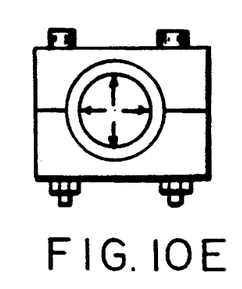

A still further method of constructing a cryogenic tank in accordance with the present invention is illustrated in FIGS. 10A–10C. With reference to FIG. 10A, a tube 81 of PBZT is placed over a tubular mandrel 83. The ends of the PBZT tube are then crimped down onto the mandrel as illustrated in FIG. 10B. A mold constructed in two halves 85 (FIG. 10C) and 87 (FIG. D) is provided with a central cavity corresponding to the expanded diameter of the PBZT tube and each half of this cavity is lined with an uncured carbon filament resin composite mixture. The crimped tube and mandrel are then placed between the mold halves, the PBZT tube is inflated to pressurize the shell and heat is applied to cure the reinforcing carbon filament composite as illustrated in FIG. 10E.

Figure 11:
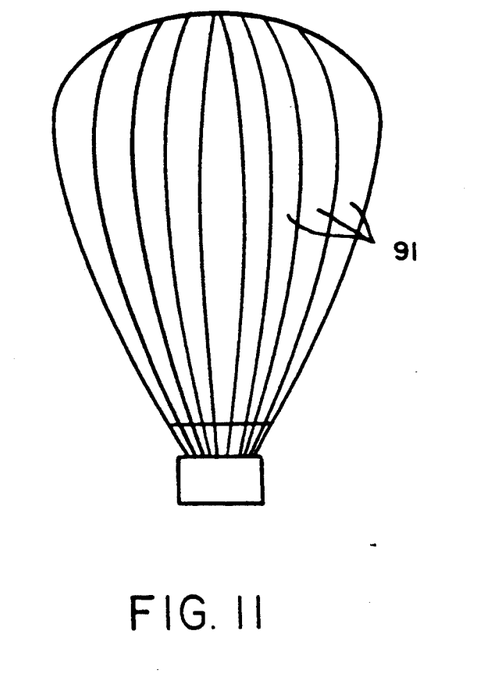
FIG. 11 illustrates a balloon constructed from biaxially oriented PBZT film.
Figure 12:
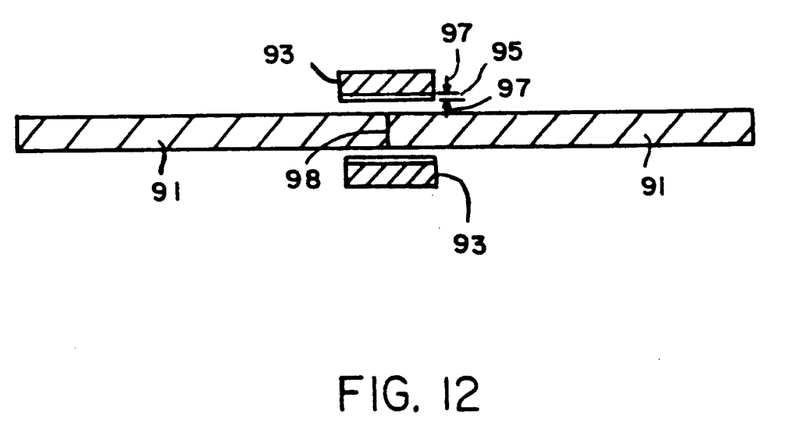
FIG. 12 illustrates a method of constructing butt joints in the making of the balloon of FIG. 10.

FIG. 11 illustrates a balloon construction utilizing oriented PBZT film in accordance with the present invention. In conventional fashion, the balloon is made up of a series of gores 91 which are taper cut to provide the overall shape of the balloon. The individual gores are preferably made up of an oriented film in which the biaxial orientations are at a relatively high angle, i.e. 45 degrees, to the length of the gores. The edges between the gores are preferably butt-joined as illustrated in FIG. 12. As illustrated in this figure, the butt joint 98 between the gores 91 is lapped on both sides with a narrow tape 93 of similar material and the several films are bonded to each other with a suitable thermoplastic adhesive 95, preferably a polyurethane. This hot melt adhesive 95 is applied in the embodiment shown to a thickness 97 of approximately 1 MIL. The balloon may also include a succession of vertically oriented tapes of PBZT film which reinforce the envelope and provide a load bearing structure. For this load distributing function, the tapes preferably have a relatively small angle biaxial orientation so as to provide a very high strength along the length of the tape.

As indicated previously, a major and somewhat surprising advantage of utilizing oriented PBZT film for the balloon vessel is that it exhibits very low permeability, e.g. 500 to 1000 times less than polyester, the material which is presently used for most scientific research balloons. Thus, when filled with a highly mobile lighter than air gas such as helium or hydrogen, the balloon will retain this gas for a very long time thereby permitting missions of long duration. Further, the PBZT film has better UV resistance than polyethylene and better strength and abrasion resistance so that survivability of the balloon is improved.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a vessel for containing a mobile or permeating fluid, a barrier layer comprising a lyotropic liquid crystal polymer film.

2. A vessel as set forth in claim 1, wherein said polymer is oriented.

3. A vessel as set forth in claim 2, wherein said vessel is a cryogenic tank.

4. A vessel as set forth in claim 3, wherein said liquid crystal polymer is a PBZ polymer.

5. A vessel as set forth in claim 4, wherein the PBZ polymer is selected from the group consisting of PBO, PBZT and PBI polymers, and random, sequential or block copolymers thereof.

6. A vessel as set forth in claim 2, wherein said vessel is a balloon containing a lighter than air gas.

7. A vessel as set forth in claim 6, wherein said liquid crystal polymer is a PBZ polymer.

8. A vessel as set forth in claim 7, wherein the PBZ polymer is selected from the group consisting of PBO, PBZT and PBI polymers, and random, sequential or block copolymers thereof.

9. A vessel as set forth in claim 2, wherein said film is biaxially oriented.

10. A vessel as set forth in claim 2, wherein said film incorporates an interpenetrating resin permeating the microfibrillar structure of said liquid crystal polymer.

11. The method of making a cryogenic tank which comprises:

wrapping a cylindrical mandrel with a first tape of a biaxially oriented lyotropic liquid crystal polymer film having a large angle of orientation with respect to the axis of the tape;

wrapping said mandrel with a second tape of a biaxially oriented lyotropic liquid crystal polymer film having a small angle of orientation with respect to the axis of the tape;

bonding the film layers to each other with a compatible resin.

12. The method as set forth in claim 11, wherein said polymer is a PBZ polymer.

13. The method as set forth in claim 12, wherein the PBZ polymer is selected from the group consisting of PBO, PBZT and PBI polymers, and random, sequential or block copolymers thereof.

14. The method of making a cryogenic tank which comprises:

forming an envelope of a lyotropic liquid crystal polymer film;

reinforcing said envelope with a carbon filament composite.

15. The method as set forth in claim 14, wherein said polymer is a PBZ polymer.

16. The method as set forth in claim 15, wherein the PBZ polymer is selected from the group consisting of PBO, PBZT and PBI polymers, and random, sequential or block copolymers thereof.

17. The method as set forth in claim 15, wherein carbon filaments are wound around said envelope and bonded with a compatible resin.

18. The method of making a balloon which comprises:

providing a series of tapered gores cut from a film of oriented lyotropic liquid crystal polymer; bonding the edges of said gores together to form a balloon envelope;

and filling said envelope with a lighter than air gas.

19. The method as set forth in claim 18, wherein said polymer is a PBZ polymer.

20. The method as set forth in claim 19, wherein the PBZ polymer is selected from the group consisting of PBO, PBZT and PBI polymers, and random, sequential or block copolymers thereof.

* * * * *

UNITED STATES PATENT AND TRADEMARK OFFICE
CERTIFICATE OF CORRECTION

PATENT NO. : 5,202,165
DATED : April 13, 1993
INVENTOR(S) : Lusignea et al.

It is certified that error appears in the above-indentified patent and that said Letters Patent is hereby corrected as shown below:

At column 1, line 7, replace "F04611-87-C-0004" with --F04611-88-C-0004--.

Signed and Sealed this

Twenty-eight Day of February, 1995

Attest:

BRUCE LEHMAN

Attesting Officer

Commissioner of Patents and Trademarks